US007142503B1

(12) United States Patent
Grant et al.

(10) Patent No.: US 7,142,503 B1
(45) Date of Patent: Nov. 28, 2006

(54) COMMUNICATION SYSTEM ARCHITECTURE AND OPERATING METHODOLOGY PROVIDING A VIRTUAL NEIGHBORHOOD NETWORK

(75) Inventors: Michael F Grant, Bishop's Stortford (GB); Igor K Czajkowski, Bishop's Stortford (GB); Brian M Unitt, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/502,699

(22) Filed: Feb. 11, 2000

(51) Int. Cl.
H04J 1/16 (2006.01)
H04J 3/14 (2006.01)
(52) U.S. Cl. .................. 370/217; 370/225; 370/332; 370/349; 455/432.1; 713/190; 713/191
(58) Field of Classification Search ............ 370/236, 370/252, 351, 352, 400, 468, 395.41, 235, 370/231, 401, 217–218, 219, 220, 225–228; 713/190–191, 200
See application file for complete search history.

(56) References Cited

U.S. PATENT DOCUMENTS

| 5,457,680 | A | * | 10/1995 | Kamm et al. ............... 370/332 |
| 5,592,466 | A | * | 1/1997 | Buczny et al. .............. 370/217 |
| 6,167,389 | A | * | 12/2000 | Davis et al. ................ 705/412 |
| 6,282,519 | B1 | * | 8/2001 | Peters et al. ................. 705/34 |
| 6,317,835 | B1 | * | 11/2001 | Bilger et al. ................ 713/194 |
| 6,496,479 | B1 | * | 12/2002 | Shionozaki ................. 370/230 |
| 6,654,346 | B1 | * | 11/2003 | Mahalingaiah et al. ..... 370/235 |

* cited by examiner

*Primary Examiner*—John Pezzlo
*Assistant Examiner*—Inder Pal Mehra
(74) *Attorney, Agent, or Firm*—Barnes & Thornburg LLP (57) ABSTRACT

A communication system (10) supports the provision of a plurality of dedicated communication resources (50–64), such as copper drops, RF links and optical fibers, to dedicated home-gateway devices (44–48) or distribution points (124). The communication resources (50–64) support broadband interconnection (104) between the dedicated home-gateway devices (44–48) or distribution points (124) and an access multiplexor (30) in a network (12). Each gateway device (44–48) or distribution point (124) generally includes a local RF transceiver (84) and associated control logic (80–82) that allows local communication (86) between gateway devices (44–48) and hence statistically multiplexed access (60–64, 89) to multiple communication resources, thereby providing increased bandwidth in uplink and/or downlink directions. With the control logic (80) operable to provide a routing and prioritisation/arbitration function, each gateway (44–48) is able to selectively engage use of supplemental, non-reserved communication resources usually associated with a dedicated ono-to-one connection between the access network (12) and at least one secondary gateway. Physical layer access to information routed via a secondary gateway within a virtual neighborhood network (90–92) comprising several gateways is restricted through an end-to-end encryption algorithm between an originating gateway and, at least, the access multilpexor (30).

46 Claims, 5 Drawing Sheets

COMMUNICATION SYSTEM ARCHITECTURE AND OPERATING METHODOLOGY PROVIDING A VIRTUAL NEIGHBORHOOD NETWORK

BACKGROUND TO THE INVENTION

This invention relates, in general, to a communication system architecture and associated operating methodology that provide a virtual neighbourhood network. The present invention is particularly, but not exclusively, applicable to a point-to-multipoint wireline environment in which a home-gateway both interfaces to a remote service provider through a dedicated communication resource and the home-gateway provides a distribution point for in-house "out-stations", such as computer terminals and control apparatus.

SUMMARY OF THE PRIOR ART

The demand for information access has resulted in the development of telecommunication systems that now support broadband data communication over existing wireline connections originally deployed to support narrowband communication between subscriber terminals. As will be understood, the requirement for information access from society, in general, places ever-increasing strain on the ability of system designers and, indeed, particular transport media to support additional traffic. Moreover, there is generally some requirement during system deployment to make an assessment of bandwidth requirements and to provision or assign bandwidth for each communication. Typically, the demand for bandwidth fluctuates with time and with respect to subscribers, and so systems designers and subscriber are left to resolve such issues as: i) whether a minimum guaranteed level of service is acceptable; whether network access denial (through blocking) is acceptable; iii) whether under utilisation of available communication resources is acceptable in order to support periods of high demand; and iv) what is the cost (generally the financial cost) associated with providing a particular service.

Recent developments in broadband communication protocols allow broadband data to be overlaid on top of (and isolated from) narrowband voice or integrated service digital network (ISDN) traffic. In this way, spare spectrum (i.e. spare frequency channels) of a twisted copper-pair communication resource can be utilised to support broadband access systems in a digital subscriber line (xDSL) environment. In this respect, and depending upon the complexity of the xDSL coding scheme, overlaid broadband systems can support data rates in excess of two Megabits per second (2 Mbps), although this rate is dependent upon the length of the twisted copper-pairs. To date, xDSL modem technology has enabled the transmission of digital information at duplex rates from 144 kbps to over 2 Mbps over the local subscriber loop consisting of unshielded twisted pair cables.

It is, of course, possible to consider providing direct copper pair connections between an exchange and every terminal in a customer site. Clearly, such a user-dedicated resource architecture provides high integrity links, but this is accomplished at the expense of having to provide considerable amounts of infrastructure and having to expend considerable effort in deploying the system. Indeed, every copper pair could actually utilise an xDSL protocol with dedicated pairs of xDSL modems. However, as will be understood, if the links are assigned principally for Internet Protocol (IP) usage, then the bursty nature of such data traffic means that the individual xDSL links will carry very little traffic for much of the time.

Current HDSL systems typically utilise baseband line (transmission) codes, such as 2B1Q, over one to three twisted copper-pairs (i.e. a point-to-point connection basis using multiple drops) between an xDSL modem associated with a subscriber and a corresponding modem in the exchange. In a multiple pair scenario, HDSL employs an inverse multiplexing technique (which can also be applied to a single logical ATM connection across multiple physical links) between the various pairs. It should be recognised that these systems utilise multiple adjacent point-to-point links to a single end-subscriber.

It is proposed that next generation xDSL devices in the home will be incorporated into a "Home-gateway", which will terminate the xDSL connection over the access network, and will distribute the content to/from and between different terminal devices in the home over a home network. Such a home network may be wireline, wireless (RF) or optical.

The rapid growth in multi-media content on the Internet (e.g. the unprecedented growth in MP3 audio), the massive growth in customer connection to the Internet, and the scale of recent industry mergers (aimed at exploiting the Internet for multimedia delivery to the home) are all indications of the importance of broadband access technology. Indeed, in North America at the end of 1999, in excess of six hundred thousand (600k) xDSL lines had been deployed, with these numbers rapidly accelerating. In fact, xDSL deployment projections in North America suggest that these will exceed two-and-a-half million connections by the end of 2000. Moreover, with increasingly versatile multimedia content available via the Internet, there is a blurring of the traditional boundaries between different delivery channels (e.g. UHF transmissions for TV, CDs and cassettes for music and the telephone line for telephones) and their associated terminal device. Increasingly, the content delivered over the standard telephone network (using xDSL technology) is aimed at the PC, the TV, the Hi-Fi Stereo system or the telephone. However, for practical large scale deployments of xDSL, customers are typically limited to less than 2 Mbps downstream and 256 kps upstream. The upstream bandwidth in particular may be limiting for some applications. The bandwidth limitation of a single practical DSL link is therefore a key issue in the growing demand for multimedia services to the home, and the ability to offer bandwidth beyond this limit will be a highly desirable capability for a service provider.

Irrespective of the service capabilities of xDSL in the wireline domain, enhancement and development of communication technologies driven by internet access (including e-commerce) requirements and high bandwidth applications, e.g. video-on-demand, are likely eventually to require the migration into the optical domain of networks now employing copper drops. Consequently, any intermediate developments in xDSL deployment strategies should ideally bear such migration requirements in mind and provide a platform that can act as an adjunct to future optically-based systems.

SUMMARY OF THE INVENTION

According to a first aspect of the present invention there is communication system comprising a core network coupled over multiple isolated connections to a plurality of distribution gateways each providing network access capacity to local data devices serviceable thereby, at least some of the plurality of distribution gateways interconnected through communication resources and wherein said interconnected distribution gateways each includes: control functionality arranged to administer access to the core network through securing network access capacity using the interconnected distribution gateways via at least one of the multiple isolated connections.

The control functionality preferably operates according to at least one of a bandwidth-driven requirement; and a fault-driven basis to secure access to the core network. Alternatively, bandwidth could be provisioned by an operator.

The control functionality preferably includes a prioritisation function that secures a guaranteed minimum bandwidth for communication with the core network for its associated data equipment, such as supported by an associated LAN.

At least some of the isolated connections may be point-to-point connections supporting digital subscriber line communications.

Each distribution gateway typically includes means for encrypting communications between its associated LAN and the core network, thereby to protect access to communications routed via an intermediate distribution gateway to the core network.

The communication system may further include an intermediate node coupled to the core network via an optical fibre, the intermediate node including: am optical transceiver for converting optical communications into electrical impulses; and a transceiver coupled to a plurality of distribution points, whereby the plurality of distribution points acquire access to the core network via the optical fibre.

In a preferred embodiment, the communication system further comprises a billing centre coupled to the core network, the billing centre configured to generate and record varying levels of charges for access to the core network in response to use by a distribution gateway of direct and indirect paths between the distribution gateway and the core network.

In a second aspect of the present invention there is provided a virtual neighbourhood network comprising a plurality of interconnected distribution gateways each providing network access capacity to associated data equipment via a combined communication resource, at least some of the plurality of interconnected distribution gateways coupled, in use, to a core network through an isolated connection and wherein each of said interconnected distribution gateways has: control functionality arranged to administer broadband access to the core network through securing a share of the combined communication resource.

In a particular embodiment, the control functionality provides a routing function for broadband communications between a plurality of interconnected distribution gateways.

In another aspect of the present invention there is a method of providing broadband access to a core network coupled over multiple isolated connections to a plurality of distribution gateways each providing network access capacity to associated data equipment, the method comprising: interconnecting at least some of the plurality of distribution to provide communication paths therebetween; and administering access to the core network for one of said interconnected gateways through securing network access capacity using at least one of the multiple isolated connections indirectly accessible to said one of said interconnected gateways via an intermediate gateway.

In a further aspect of the present invention there is provided a home-gateway providing network access, in use, to at least one of an associated local area network and an associated data device, the distribution point connectable, in use, at least one other home-gateway having access to a core network via a first isolated connection, the home-gateway comprising: control functionality arranged to administer access to the core network through securing network access capacity through the first isolated connection.

The home-gateway is generally further connectable, in use, to the core network through a second isolated connection and wherein the control functionality is further arranged to administer access to the core network through securing network access capacity through the first isolated connection and the second isolated connection.

In yet a further aspect of the present invention there is provided a computer program product for a home-gateway that controls broadband connection to a core network over isolated communication resources, the computer program product comprising: code that arbitrates interconnection of the home-gateway with at least one further home-gateway connectable to the core network; and code that directs the home gateway to administer access to the core network for the home gateway through securing a share in network access capacity provided by the isolated communication resources associated with both the home-gateway and the at least one further home-gateway; wherein the codes reside in a computer readable medium.

In yet another aspect of the present invention there is a method of generating a charge against a subscriber obtaining broadband access to a core network through isolated connections between a plurality of interconnected distribution gateways each supporting data equipment, the subscriber being affiliated with a particular distribution gateway, and wherein the method comprises: generating a varying level of subscriber charge for broadband access to the core network in response to use by the subscriber of direct and indirect isolated connections between their associated distribution gateway and the core network; and recording the varying level of charge in a database for subsequent billing purposes.

In still yet another aspect of the present invention there is provided a computer program product generating a charge against a subscriber obtaining broadband access to a core network through isolated connections between a plurality of interconnected distribution gateways able to support data communication devices, the subscriber being affiliated with a particular distribution gateway, the computer program product comprising: code that generates a varying level of subscriber charge for broadband access to the core network in response to use by the subscriber of direct and indirect isolated connections between their associated distribution gateway and the core network; and code that records the varying level of charge in a database for subsequent billing purposes; wherein the codes reside in a computer readable medium.

In still yet another aspect of the present invention there is provided a network control equipment responsive to multiple isolated connections to a plurality of home-gateways each providing network access capacity to local data devices serviceable thereby, at least some of the plurality of home-gateways interconnected through communication resources and wherein said interconnected home-gateways each secure network access via multiple isolated connections, the network control equipment comprising: a consolidation function arranged to direct downstream information packets to a data device associated with a first home-gateway via both a direct isolated connection and an indirect direct isolated connection via a second home-gateway.

The consolidation function may be operable having regard to congestion conditions on the multiple isolated connections.

The consolidation function may be operable having regard to priority traffic using the indirect isolated connection.

In still yet a further aspect of the present invention there is provided a method of communicating data packets between a network that is coupled to a plurality of distribution gateways through multiple isolated connections, each of the plurality of distribution gateways providing network access capacity to local data devices serviceable thereby, at least some of the plurality of distribution gateways interconnected through communication resources and wherein said interconnected distribution gateways secure network access via multiple isolated connections, the method comprising: sending data packets between a data device, associated with a first distribution gateway, and the network in an un-encrypted form across a direct isolated connection existing between the network and the distribution gateway; and sending encrypted data packets between the data device and the network across an indirect isolated connection existing between the network and a second distribution gateway interconnected to the first distribution gateway.

In another aspect of the invention there is provided a method of generating a charge for provisioning network access to a first subscriber in a communication system in which a plurality of subscribers are able to obtain broadband access of varying bandwidth to a core network using multiple isolated connections between a plurality of interconnected distribution gateways and the network, the first subscriber being affiliated with a first distribution gateway interconnected to at least one other distribution gateway such that a combined broadband access capacity supported by the first distribution gateway and the at least one other distribution gateway can be shared therebetween, the method comprising: monitoring and recording access made to a direct isolated connection between the first distribution gateway and the network by subscribers other than the first subscriber; charging the first subscriber for leasing the direct isolated; and discounting the charge for provisioning network access to the first subscriber based on access made to bandwidth supported by the direct isolated connection by subscribers other than the first subscriber.

Discounting may be subject to a recorded utilisation of the direct isolated connection by subscribers and/or may be subject to meeting a predetermined utilisation of the direct isolated connection by the subscribers other than the first subscriber.

In generality, the present invention advantageously overcomes bandwidth limitations otherwise imposed by isolated xDSL link (provided on a point-to point basis to a home or office environment) by allowing multiple neighboring communication links (e.g. xDSL links or other links, such as coax, radio or fibre) to be managed as a consolidated resource. A customer base supported by the system of the present invention is therefore beneficially able to make use of statistical multiplexing of the individual point-to-point connections across the associated customer base, thereby to provide increased peak bandwidth capacity to, for example, those households that form part of a virtual neighbourhood network.

With increased bandwidth being available to households, a service provider is able to differentiate service provisioning to individual homes on a cost basis, which may be based on individual, group or access criteria to the enhanced bandwidth. The service provider is therefore able to augment revenue by charging a premium rate to those subscriber's wishing to take advantage of improved connection capabilities, although the service provider preferably always guarantees a minimum level of service (by providing a minimum point-to-point bandwidth) to all subscribers.

With the ability of having access to multiple, non-adjacent (essentially point-to-point) communication resources, the system of the present invention is able to benefit from acquired redundancy that protects against link-failure. Moreover, the accessibility to multiple routing paths from each home-gateway provides a diagnostic path in the event of a customer's xDSL-link failure.

BRIEF DESCRIPTION OF THE DRAWINGS

Exemplary embodiments of the present invention will now be described with reference to the accompanying drawings, in which.

DETAILED DESCRIPTION OF A PREFERRED EMBODIMENT

Resource-sharing is a well-known concept in communication networks. In the core network, for example, traffic from a number of disparate customers may be consolidated onto a single transmission link, where bandwidth is usually less than the sum of the maximum bandwidth to the connected customers. In a local area network (LAN), an ethernet network may have a large number of connected computers which are able to share this resource. However, these prior art systems, as will now be appreciated, have only considered the use of multiplexed resources within a backbone network and upstream of a Local Access Concentrator located in a remote (infrastructure, e.g. exchange) location where all associated lines terminate at a common location. In contrast, the present invention looks to an access distribution network to the customer premises, which access distribution network is a point-to-point network not apparently lending itself to sharing of any medium.

Figure 1:
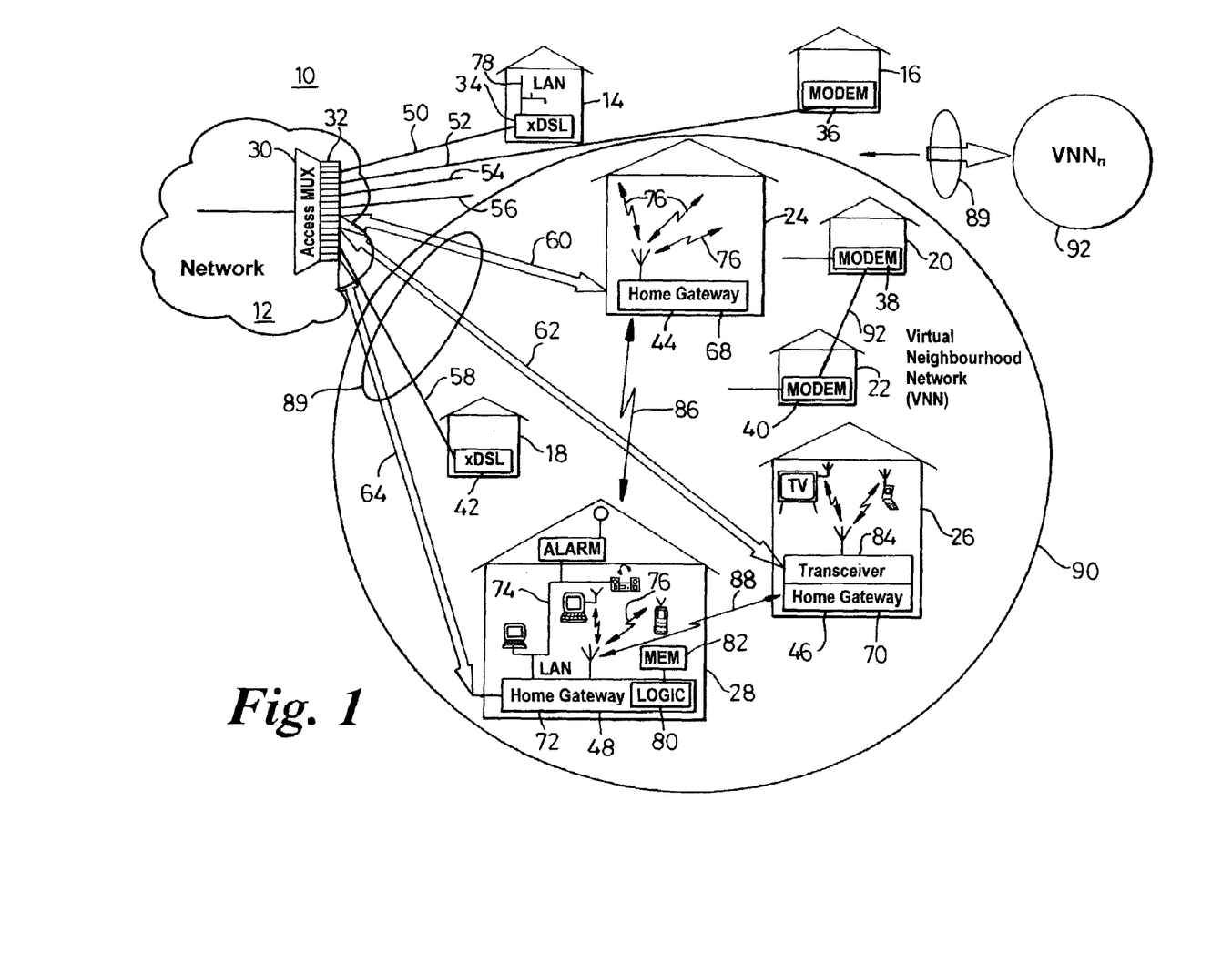
FIG. 1 is a block diagram of a communication system architecture according to a preferred embodiment of the present invention.

Turning to FIG. 1, there is a block diagram of a communication system architecture 10 according to a preferred embodiment of the present invention. The communication system 10 includes a network 12, such as an IP network, accessible by a multiplicity of serviceable locations 14–28, e.g. household or office environments. Access to the core network 12 is provided through a suitable interface 30, such as an access multiplexor having an associated bank of modems 32; the location of modems 32 is shown to be juxtaposed to the access multiplexor, although their location is arbitrary. Typically, communication (i.e. information transfer) between network 12 and the multiplicity of serviceable locations 14–28 uses a broadband communication system, with the modems 32 (associated with the network 12) and hence modems integrated into gateways (or the like) 34–48 containing a corresponding modem function. For example, the preferred embodiment of the present invention contemplates that an xDSL communication links will be used to support broadband data transfer between the network 12 and the various multiplicity of serviceable locations 14–28. Access to the core network 12 may make use of a plurality of connection media, including wireline (e.g. copper drops, cable, optical fibres or radio frequency (RF) communication resources 50–64), with varying amounts of bandwidth (i.e. different bit pipes) provided by the these communication resources.

The preferred embodiment of the present invention contemplates that xDSL communication is supported across the copper pair communication resources 50–64 using xDSL protocols.

Turning to the internal architectures of the household or office environments (i.e. serviceable locations 14–28), each will include some form of interface, as previously indicated, to allow an access path to the access multiplexor 30. Some of the household or office environments may have basic xDSL or relatively simple narrowband modems, but at least some of the serviceable locations 14–28 include a home-gateways 68–72 that supports a high bandwidth connection path to the core network 12. The home-gateway 68–72 is an interface that allows an in-house (or in-office LAN 74–78, as the case may be) to provide service to a plurality (but at least one) device within the house. For example, the home-gateway 68–72 provides access to communication bandwidth for use by computers, household systems (such as security systems and electrical appliances), and HiFis. In other words, each home-gateway integrates an access modem (e.g. xDSL) and home-networking functionality to distribute multimedia and voice content to/from and between home terminals (e.g. PC, TV, telephone, etc).

The LAN 74–78 may be an ethernet connection, but is preferably an RF LAN 76, since the present invention preferably makes use of this relatively low power RF system; the reasons for this preference will become clear later.

It will be understood that the detail of each serviceable location in FIG. 1 has been omitted for the sake of clarity of the figure, although the general structural requirements of the system of the preferred embodiment are shown within various of the serviceable locations 14–28. Each home-gateway 68–72 of the preferred embodiment therefore includes control logic 80 and some associated memory 82, as well as a transceiver 84 that supports the RF LAN 76. As will be described later, the control logic is provisioned to provide prioritisation, arbitration and encryption functions.

According to the underlying inventive notion, bandwidth limitations associated with isolated (point-to-point) xDSL links are mitigated by allowing multiple neighbouring xDSL links (or the like) to be managed as a consolidated resource 89 with all the benefits of statistical multiplexing across the associated customer base. Preferably, a guaranteed service level to any individual subscriber is not compromised by the ability of a home-gateway within the virtual neighbourhood network to make use of unused, un-assigned or unreserved bandwidth capacity ion such neighbouring, broadband point-to-point connections to the access multiplexor 30 (of the network 12). The present invention addresses the bandwidth limitations of an individual xDSL connection to the home by exploiting novel interconnection capabilities of multiple home-gateway devices and the local distribution of such devices in the neighbourhood. As previously eluded to, the preferred embodiment invention recognises (but is not limited to) the likely use Radio Frequency (RF) within a home distribution environment (e.g. an IEEE802.11 LAN that provide approximately 11 Mbps), and the sporadic and statistically small actual usage of the bandwidth of any individual DSL connection to a particular home.

More specifically, the preferred embodiment of the present invention makes use of the range of RF in-premises distribution, since such RF signals 86–88 typically extend beyond the bounds of the subscriber's premises and may include multiple adjacent properties in the neighbourhood. This opens up the possibility for the subscriber's home-gateway device to communicate with other gateway devices deployed in the neighbourhood and hence to gain access to unused communication resources that are otherwise provided on a point-to-point basis. The inter-communicating home-gateway devices therefore form a virtual neighbourhood network (VNN) 90 having an area defined by the access capabilities of each home-gateway. In other words, the present invention uses this capability for a subscriber's home-gateway dynamically to utilise additional (unused) bandwidth on neighbouring (but isolated) DSL connections (or the like), such that the subscriber has access to increased bandwidth and can consequently experience a service quality greater than that supported by his own DSL line in isolation.

As will now be understood, each home-gateway (which is simply an end-to-end connection to the access multiplexor 30 of the network 12) can belong to one or more virtual neighbourhood networks 90–92 depending upon reach of, for example, it RF transceiver, and so each gateway may have access to differing numbers of point-to-point communication resources. Access to unused link capacity from gateways out of range of an individual premise via RF links could be achieved through multiple hops via intermediate gateways. Furthermore, the virtual neighbourhood networks 90 may, in fact, be within a single building (such as a factory facility) if multiple point-to-point connections terminate at individual home-gateways.

Of course, in an RF LAN environment, the necessary home-gateway interconnection mechanism is already in place, but the underlying inventive concept can clearly make use of direct wireline connection (reference numeral 92 of FIG. 1) between houses in a localised vicinity to benefit from the concepts of the present invention. For example, neighbouring home-gateways could be linked though category 5 cable. Alternatives also include optical links or coax links, or use of a radio system different to that used for the home LAN.

Local distribution, as will be understood, may be provided when a network access/service provider offers a particular service (requiring a particular form of device) in a given community. Indeed, since service is ultimately where revenue is generated by the network access/service provider, the infrastructure may be provided at nominal cost with the ability to make use of unused local channel resource capabilities charged at a premium to a subscribing household (or business unit). In a complementary sense, a subscriber whose dedicated line (i.e. isolated communication resource) is access by third parties on a regular basis, may be subject to a discounted line rental charge offered by the service provider. Clearly, the service provider's records could be used to identify whether and to what extent a discount is warranted.

Figure 2:
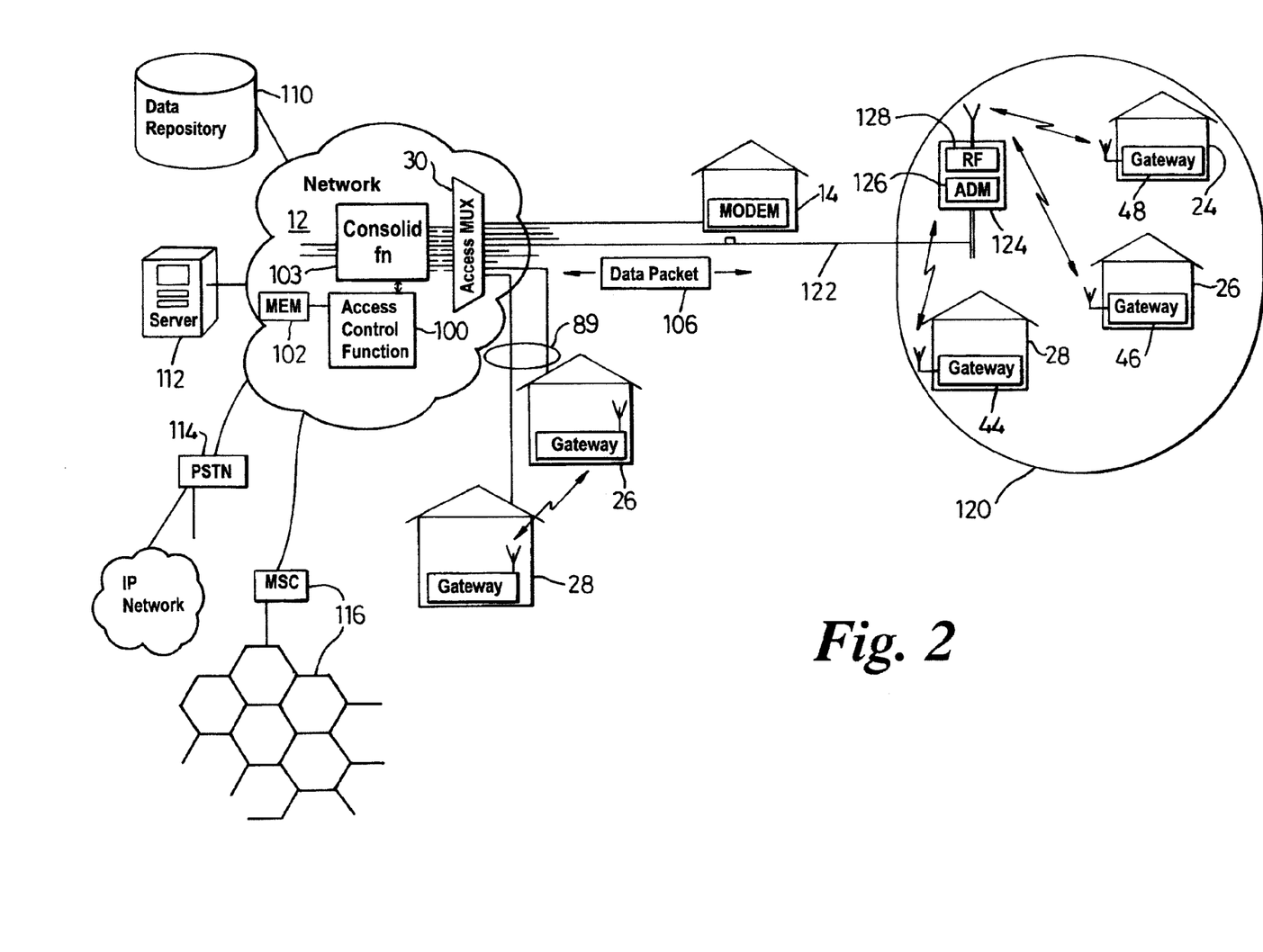
FIG. 2 is a block diagram of the communication system architecture of FIG. 1 illustrating different aspects of a preferred embodiment of the present invention.

The network is further shown to contain access control logic 100 (and an associated memory device 102) that co-operate with a consolidation function 103 to provide routing control of downlink data and re-assembly control of upstream data, such as communicated in the form of data packets. The access control logic instructs the consolidation function 103 to direct downstream information packets to the direct link to an end customer or to an indirect link via another customer attached to the VNN according to congestion conditions, taking into account any priority traffic using the indirect link for traffic intended for the other customer. In the upstream direction, traffic associated with a particular customer arriving on either the direct link from that customer or on any indirect link is reassembled into one or more traffic streams for access to the customer's one or more service providers. The network 12 of FIG. 2 is thus shown to interconnect to different services, including data repositories (or other network service peripherals) 110, servers 112 and other communications networks, including Public Switched Telephone Networks (PSTNs) 114 and cellular networks 116. In a packet based switch system, the routing and resolution functions would normally make use of addressing information associated with the packets. The data packets 104 generally include a header containing control overhead, including for example, address information, routing information and conventional coding information, and a data portion. The access consolidation function 103 may contain capabilities such as packet re-ordering, address translation, encryption, decryption and prioritisation. In FIG. 2 the access control logic and the access consolidation function are shown as residing close to a single access multiplexor. In a practical network implementation the access control logic and access consolidation function may be associated with a plurality of access multiplexors and may also reside elsewhere, such as at the site of an Internet Service Provider.

As regards encryption, it is preferable that traffic that passes through the premises of a different (i.e. non-addressed) customer is encrypted and, in this respect, algorithms based on, for example, the North American Data Encryption Standard (DES) are readily available and can be applied to the methodology of the present invention. If required, encryption keys can be exchanged over the direct link which can, of course, be regarded as secure. Data transmissions between end-point may therefore be subject to encryption in circuitous routes (via intermediate home-gateways) whilst being in non-encrypted form for a simultaneous direct point-to-point connection between a specific home-gateway and the remote core network 12.

Referring briefly to FIG. 2, roll-out and migration of the present invention is illustrated within the communication system 10 of FIG. 1. The network 12 of FIG. 2 is also shown to interconnect to different services, including data repositories (or other network service peripherals) 110, servers 112 (which may act as charge centre for billing purposes) and other communication networks, including public switched telephone networks (PSTNs) 114 and cellular networks 116.

As regards migration of the concepts of the present invention into the optical domain, FIG. 2 contemplates an enhanced system in which a particular VNN 120 has been assessed as generally supporting high bandwidth communications. Consequently, a decision has been made by the system operator to employ an optical fibre between the access multiplexor 30 and a curbside cabinet 124 or the like. The curbside cabinet 124 includes some form of optical-to-electrical converter (such as an add-drop multiplexor, ADM, 126) that is coupled to RF transceiver circuitry 128 that, typically, is in line-of-sight/reach of the home-gateway devices 44–48. Consequently, the home-gateway devices 44–48 can communicate with the curbside cabinet 124 to obtain access to the communication resources of the optical fibre 122. FIG. 2 therefore illustrates how the inventive concept of the present invention is scaleable and can support high system penetration and hence a graceful deployment of fibre in the local loop as needs justify. Of course, the RF transceiver could be substituted for an alternative transceiver, such as infra-red, coax or the like.

Figure 3:
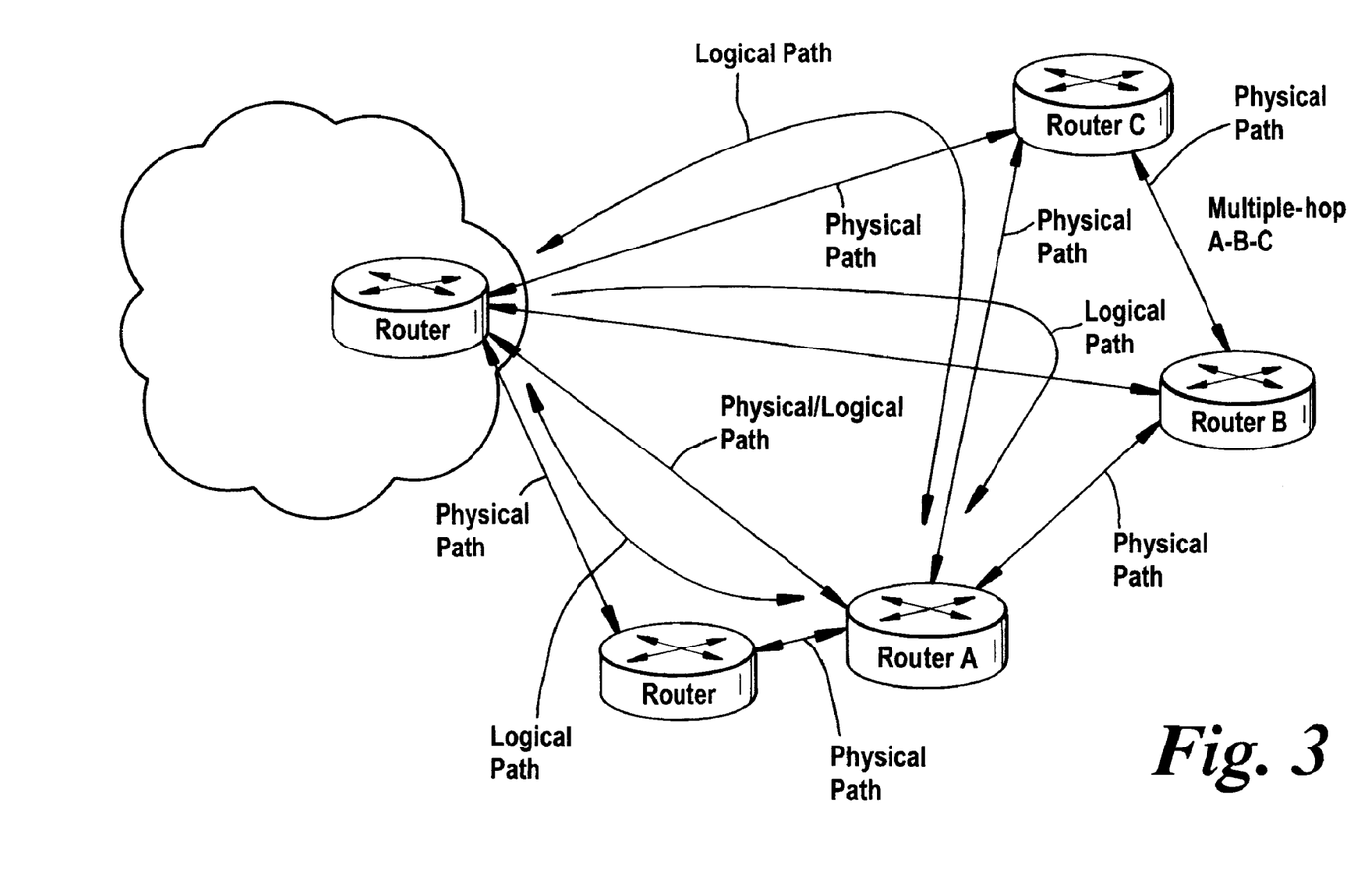
FIG. 3 is a router-based model to the preferred embodiment of FIG. 1.

In relation to the securing of bandwidth on neighbouring point-to-point communication resources, the control logic of each home-gateway wishing to acquire additional capacity negotiates with a neighbouring gateway over, usually, a dedicated control channel, with access control logic generally appraised of any arbitrated decision; this appraisal could, of course, be implied by a packet origination identity within the header of the data packet 106. To ensure that physical layer access cannot be acquired by remote (non-originating) home-gateways, it is preferred that all communication between the originating home gateway and the network 12 be suitably encrypted using techniques readily appreciated by the skilled addressee. Consequently, any intermediate node used as an access pipe essentially acts as a router, as shown in FIG. 3, and does not interpret end-to-end communications but merely forwards/routes packets to an indicated destination. Putting this a slightly different way, a practical realisation of a preferred embodiment of the present invention employs end-to-end encryption between the originating home-gateway device and at least the line terminating equipment (i.e. the access multiplexor 30) hosting the xDSL modems (and possibly encryption to the service provider). Such encryption would eliminate any possibility for the user of a "stepping-stone" home-gateway accessing another customer's data at any layer in the stack. This is quite distinct from home-network encryption that would, in any event, be required on RF links in the home environment between the gateway and terminal devices.

According to preferred embodiments of the present invention, sharing of resources might be implemented in a number of different ways. For example, by way of either a transparent model under network operator control or through a visible model, such as a neighbourhood club.

As regards the transparent model, the network operator may offer service to each subscriber with a guaranteed level of service and service characteristics. A subscriber might, however, pay a higher or additional tariff to benefit from the local statistically managed resource (though the subscriber may not be made aware of the details of how his extra bandwidth is provided and the subscriber may be paying to benefit from "higher bandwidth when available"). The network operator manages the VNN of isolated xDSL lines as a consolidated resource to deliver the improved service level when available, whilst never compromising the minimum level of service for any individual subscriber.

In the visible model, a group of neighbours agree to benefit collectively from such a service offered by their service provider, and they subscribe for the service at an increased tariff.

To support the guaranteed minimum level of service to each customer, the home-gateway device has incorporated within its control logic 80 a prioritisation function that ensures priority for traffic originating or terminating on its own terminal devices. Of course, it would be possible to always reserve some bandwidth, but it is preferred that intra-VNN control and arbitration be actioned to maximise the statistic benefit obtainable from the present invention; hence bandwidth allocation is truly dynamic.

Figure 4:
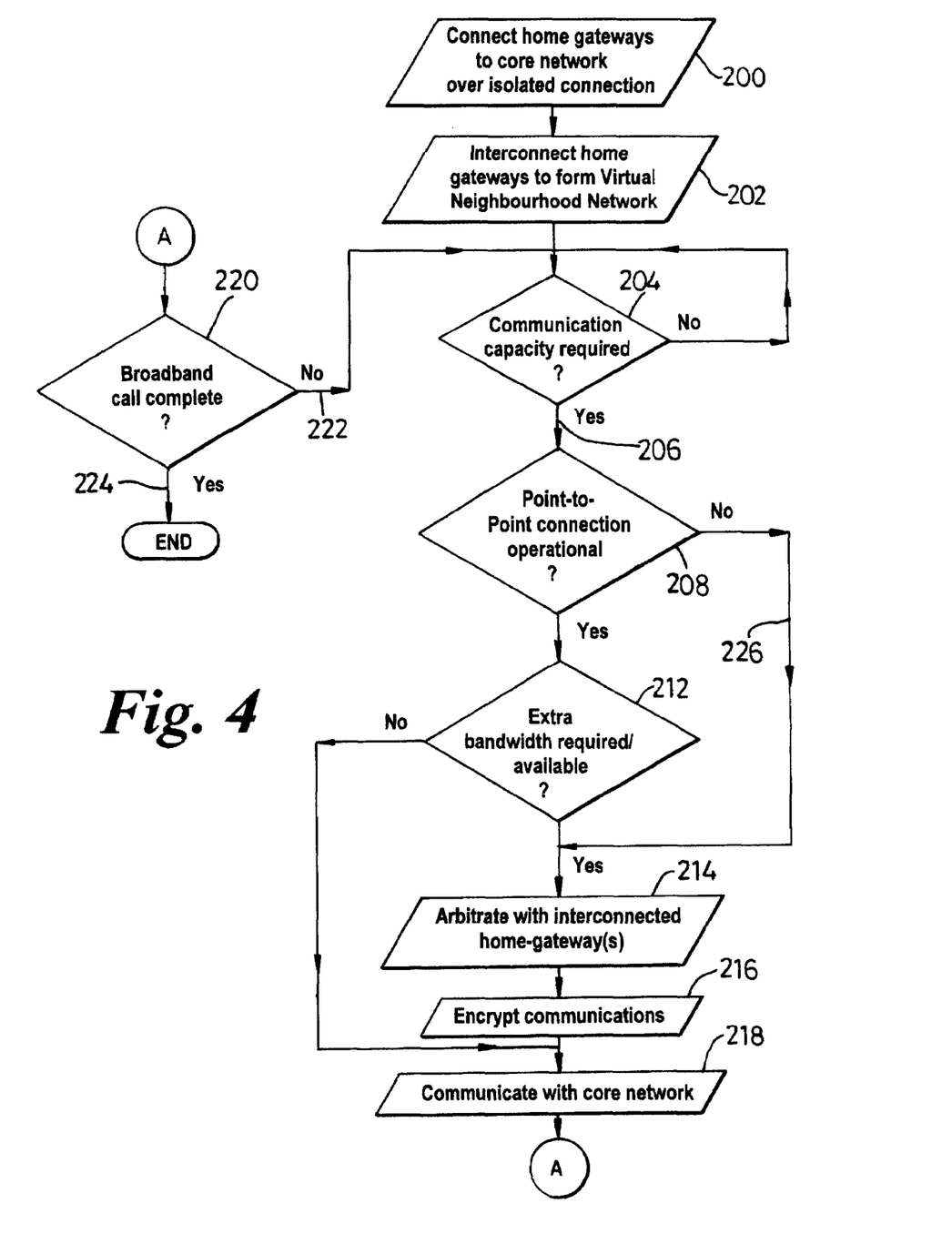
FIG. 4 is a flow diagram of a preferred bandwidth acquisition process undertaken by FIG. 1.
Figure 5:
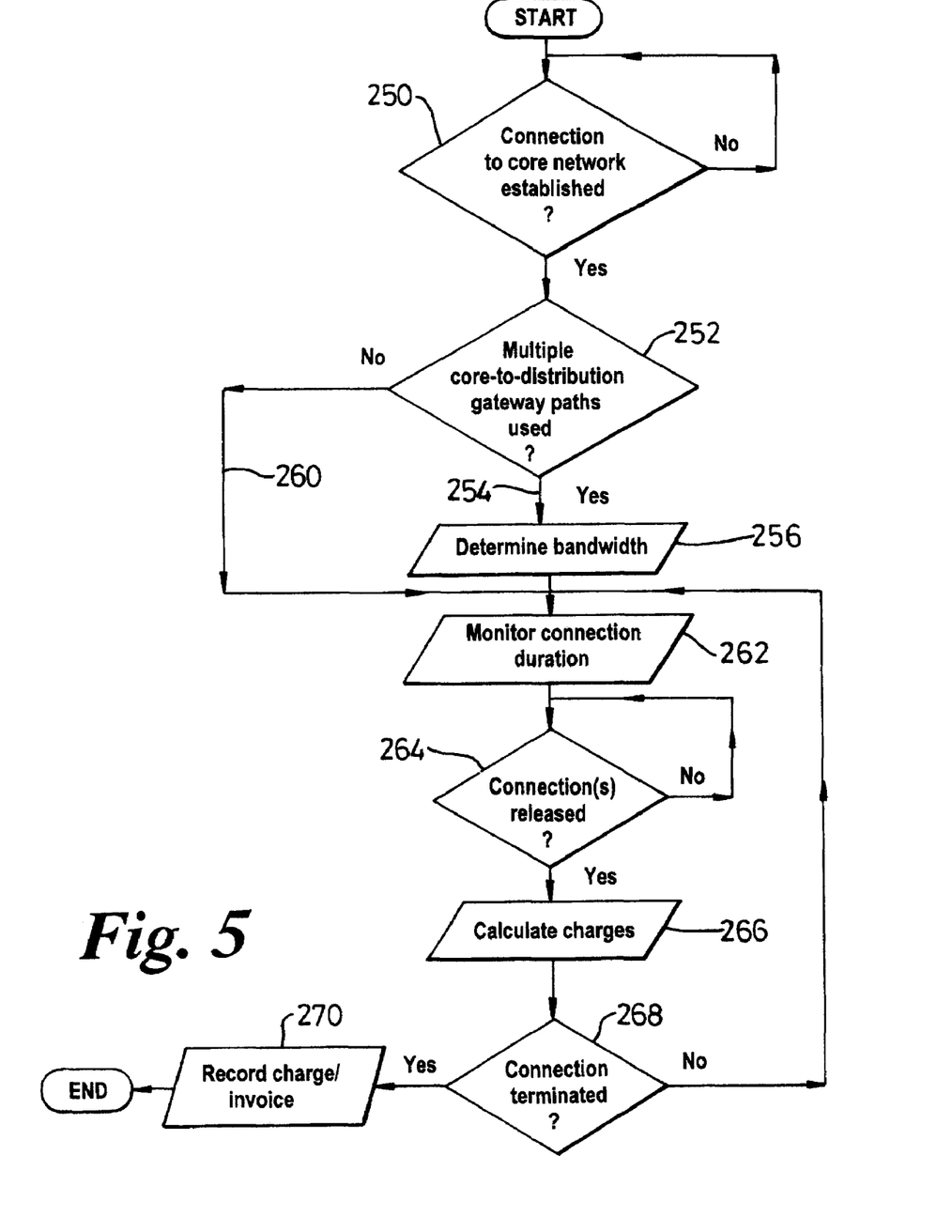
FIG. 5 illustrates a flow diagram of a charging regime that may be employed by a service provider in accordance with a preferred embodiment of the present invention.

FIGS. 4 and 5 are based on a connection-orientated model where a communication event is treated as a single call for arbitration and billing purposes. An alternative connectionless model is also possible where arbitration and billing are performed on a packet-by-packet basis.

With the process of FIG. 4, connection of the home gateways over isolated connections 200 and interconnection 202 of the gateways to form a virtual neighbourhood network can be assumed to have been completed at system deployment or upon subscriber equipment purchase/upgrade. Essentially, at 204, the system remains in a loop until communication capacity is requested 206. An assessment is then made as to whether a leased link (i.e. a direct isolated connection between the network and the gateway) is operational 208 and in the affirmative 210 a decision is then made as to whether extra bandwidth is available/required 212. Should extra bandwidth be available through indirect isolated links associated with interconnected home-gateways, the interconnected gateways undertake arbitration 214 to determine link capacity, whereafter the control logic 80 in the appropriate home-gateway encrypts 216 data packets or the like. Communication 218 with the network is then able to occur. At some point, a decision is made as to whether the broadband call is complete 220 and in the negative 222 the process loops back to determine whether, effectively, additional communication capacity is required and subsequently whether such additional communication capacity/bandwidth is available. If the decision from block 222 indicates that the broadband call is complete (i.e. the affirmative route 224), the communication resources to the network 12 are released, and the process resets.

Should the direct point-to-point connection fail (path 226 from decision block 208), the process skips to the step of arbitration 214.

As regards FIG. 5 this shows one possible billing regime. A server monitors whether connections to the core network 12 have been established 250. Once a call/connection is set up, a billing centre (e.g. server 112 of FIG. 2) determines whether multiple core-to-distribution gateway paths are used 252. In the affirmative 254, a determination 256 of utilised bandwidth is undertaken, otherwise flow proceeds 260 to monitoring connection duration 262 (which in any event follows the determination of bandwidth). The billing centre, in call, looks for release 264 of resources and then calculates 266 charges on a dynamically varying bandwidth basis. The process looks for connection termination 268 and, in the negative, continues to monitor 262 utilised bandwidth, otherwise the server records 270 a charge ready for subsequent invoicing to the subscriber/user at a later date.

In summary, the present invention therefore advantageously addresses the bandwidth limitations of an individual xDSL connection to the home by exploiting novel inter-home networking capabilities of a home-gateway device and the local distribution of such devices in the neighbourhood. The key concept is the extension of the exploitation of statistical multiplexing and sharing of a bandwidth resource all the way to the customer premises, even where these are connected by isolated copper pairs (or the like). This invention effectively allows a grouping of individual isolated access lines into a consolidated resource that the operator (or home-gateway) can manage statistically to deliver optimum service to subscribers.

Consequently, deployment of the present invention is able to mitigate the practical deployment limitations of xDSL bandwidth otherwise required to ease loop qualification, deployment and provisioning effort. Therefore, in a VNN environment of three premises, each of whom have an ADSL link supporting 1.5 Mbps downstream and 256 kbps upstream, these customers can utilise up to a peak of 4.5 Mbps downstream and 768 kbps upstream.

The ability to provide the gateways of the preferred embodiment with increased acquisition of locally available bandwidth through a statistical multiplexing of secondary point-to-point (xDSL or similar) broadband connections can be supported through the supply of dedicated (pre-configured) devices having the necessary control logic and interface functionality. Of course, the present invention can be supported by application software, provided the necessary infrastructure connections between local gateways within the virtual neighbourhood network are available. Consequently, the application software could be downloaded over the network (in the form of encoded electrical/optical impulses or the like) or in the form of a computer program product, such as a DVD, a CD-ROM or the like.

It will, of course, be appreciated that the above description has been given by way of example only and that modifications in detail may be made within the scope of the present invention. For example, the underlying inventive concept is applicable to a multitude of readily appreciated connection media between the home-gateway and either the exchange/base station transceiver or any interconnected distribution point (e.g. a curbside unit or cabinet). Therefore, it will be understood that the preferred embodiment has merely utilised a wireline (copper-drop) connection scheme for the sake of explanation only. Furthermore, whilst the preferred embodiment of the present invention contemplates that gateway interconnection within the virtual neighbourhood network of the present invention is based on an extension of an RF LAN, it will clearly be understood that direct physical forms of connection between gateways could be undertaken. Indeed, in housing developments, such direct house-to-house connections house-based LANs may be easy to install, significantly cheaper and more desirable (in view of a prevalent RF interference environment) than an alternative RF system. As regards the communication protocol used, digital subscriber line (xDSL) technology is only one such exemplary form of communication mechanism that may be deployed within the scope of the present invention, since other communication techniques (apparent to the skilled addressee) may benefit from concept of a virtual neighbourhood network architecture as expounded in detail above.

Although the present invention has been described in relation to an in-house LAN-type environment supporting a plurality of units, sharing of access resources in accordance with the present invention is clearly applicable to a home-gateway that merely supports a single data/information appliance, such as a direct coupled computer. Furthermore, the present invention can be employed to allow gateways that, perhaps, do not have direct access to either a suitable modem or dedicated point connection to the network 12 to participate within the VNN, and hence to benefit from shared resources.

We claim:

1. A communication system comprising a core network coupled over multiple isolated connections to a plurality of distribution gateways each providing network access capacity to local data devices serviceable thereby, at least some of the plurality of distribution gateways interconnected through communication resources and wherein said interconnected distribution gateways each includes:

control functionality arranged to administer access to the core network through securing network access capacity via at least one of the multiple isolated connections wherein a first of the gateways accesses the core network via an isolated connection to a second of the gateways when an isolated connection to the first gateway is unable to support access to the core network.

2. The communication system of claim 1, wherein the control functionality operates according to at least one of:
   a bandwidth-driven requirement; and
   a fault-driven basis to secure access to the core network.

3. The communication system of claim 1, wherein the control functionality includes a prioritisation function that secures a guaranteed minimum bandwidth for communication with the core network for associated data equipment.

4. The communication system of claim 1, wherein at least some of the isolated connections are point-to-point connections supporting digital subscriber line communications.

5. The communication system of claim 1, wherein each distribution gateway includes means for encrypting communications between an associated data device and the core network, thereby to protect access to communications routed via an intermediate distribution gateway to the core network.

6. The communication system of claim 1, further comprising an intermediate node coupled to the core network via an optical fibre, the intermediate node including:
   an optical transceiver for converting optical communications into electrical impulses; and
   a transceiver coupled to a plurality of distribution points, whereby the plurality of distribution points acquire access to the core network via the optical fibre.

7. The communication system of claim 1, wherein the communication resources interconnecting said distribution gateways include at least one of RF channel resources, optical connections and wireline connections.

8. The communication system of claim 1, further comprising a billing centre coupled to the core network, the billing centre configured to generate and record varying levels of charges for access to the core network in response to use by a distribution gateway of direct and indirect paths between the distribution gateway and the core network.

9. A virtual neighbourhood network comprising a plurality of interconnected distribution gateways each providing network access capacity to associated data equipment via a combined communication resource, at least some of the plurality of interconnected distribution gateways coupled, in use, to a core network through an isolated connection and wherein each of said interconnected distribution gateways has:
   control functionality arranged to administer broadband access to the core network through securing a share of the combined communication resource wherein a first of the distribution gateways accesses the core network via an isolated connection to a second of the gateways when an isolated connection to the first distribution gateway is unable to support access to the core network.

10. The virtual neighbourhood network of claim 9, wherein the control functionality provides a routing function for broadband communications between a plurality of interconnected distribution gateways.

11. The virtual neighbourhood network of claim 9, wherein the control functionality operates according to at least one of:
   a bandwidth-driven requirement; and
   a fault-driven basis to secure access to the core network.

12. The virtual neighbourhood network of claim 9, wherein the control functionality includes a prioritisation function that secures a guaranteed minimum bandwidth for communication with the core network for one of an associated data device and a local area network (LAN).

13. The virtual neighbourhood network of claim 9, wherein the isolated connections are point-to-point connections supporting digital subscriber line communications.

14. The virtual neighbourhood network of claim 9, wherein each distribution gateway includes means for encrypting communications between the core network and at least one of an associated LAN and an associated data device, thereby to protect access to communications routed via an intermediate distribution gateway to the core network.

15. The virtual neighbourhood network of claim 9, further comprising an intermediate node coupled to the core network via an optical fibre, the intermediate node including:
   an optical transceiver for converting optical communications into electrical impulses; and
   a transceiver coupled to a plurality of distribution points, whereby the plurality of distribution points acquire access to the core network via the optical fibre.

16. The virtual neighbourhood network of claim 9, wherein the communication resources interconnecting said distribution gateways include at least one of RF channel resources, optical connections and wireline connections.

17. The virtual neighbourhood network of claim 9, further comprising a billing centre coupled to the core network, the billing centre configured to generate and record varying levels of charges for access to the core network in response to use by a distribution gateway of direct and indirect paths between the distribution gateway and the core network.

18. A method of providing broadband access to a core network coupled over multiple isolated connections to a plurality of distribution gateways each providing network access capacity to associated data equipment, the method comprising:
   interconnecting at least some of the plurality of distribution gateways to provide communication paths therebetween; and
   administering access to the core network for one of said interconnected distribution gateways through securing network access capacity using at least one of the multiple isolated connections indirectly accessible to said one of said interconnected distribution gateways via an intermediate gateway when an isolated connection to said one of said distribution gateways is unable to support access to the core network.

19. The method of providing broadband access according to claim 18, the method further comprising:
   securing a guaranteed minimum bandwidth for communication between the core network and associated data equipment of at least some of the distribution gateways.

20. The method of providing broadband access according to claim 18, wherein the isolated connections are point-to-point connections supporting digital subscriber line communications.

21. The method of providing broadband access according to claim 18, the method further comprising:
   selectively encrypting communications between each LAN and the core network, thereby to protect access to communications routed via an intermediate distribution gateway to the core network.

22. The method of providing broadband access according to claim 18, wherein the distribution gateways are interconnected by at least one of RF channel resources, optical connections and wireline connections.

23. The method of providing broadband access according to claim 18, the method further comprising:
   generating a varying level of subscriber charge for access to the core network in response to use by a distribution gateway of direct and indirect paths between the distribution gateway and the core network.

24. A home-gateway providing network access, in use, to at least one of an associated local area network and an associated data device, the home-gateway being connectable, in use, to at least one other home-gateway having access to a core network via a first isolated connection, the home-gateway comprising:

control functionality arranged to administer access to the core network through securing network access capacity through the first isolated connection when an isolated connection to the home-gateway is unable to support access to the core network.

25. The home-gateway of claim 24, further connectable, in use, to the core network through a second isolated connection and wherein the control functionality is further arranged to administer access to the core network through securing network access capacity through the first isolated connection and the second isolated connection.

26. The home-gateway of claim 24, wherein the control functionality operates according to at least one of:

a bandwidth-driven requirement; and a fault-driven basis to secure access to the core network.

27. The home-gateway of claim 24, wherein the control functionality includes a prioritisation function that secures a guaranteed minimum bandwidth for communication with the core network for said at least one of its associated local area network and the associated data device.

28. The home-gateway of claim 24, wherein at least some of the isolated connections are point-to-point connections supporting digital subscriber line communications.

29. The home-gateway of claim 24, further including means for encrypting communications between said at least one of the associated LAN and said associated data device and the core network, thereby to protect access to communications routed via said other home gateway to the core network.

30. The home-gateway of claim 24, wherein the home gateway includes an RF transceiver to provide both connectivity to said at least one of the associated LAN and said associated data device and interconnection to said other home gateway.

31. A computer program product for a home-gateway that controls broadband connection to a core network over isolated communication resources, the computer program product comprising:

code that arbitrates interconnection of the home-gateway with at least one further home-gateway connectable to the core network; and     code that directs the home gateway to administer access to the core network for the home gateway through securing a share in network access capacity provided by the isolated communication resources associated with both the home-gateway and the at least one further home-gateway when the isolated communication resources to the home-gateway are unable to fully support access to the core network;

wherein the code that arbitrates interconnection and the code that directs the home gateway reside in a computer readable medium.

32. The computer program product of claim 31, further comprising:

code that secures a guaranteed minimum bandwidth for communication between the core network and a data communication device coupled to the home-gateway.

33. The computer program product of claim 31, wherein at least some of the isolated communication resources are point-to-point connections supporting digital subscriber line communications.

34. The computer program product of claim 31, further comprising:

code that encrypts communications between data communication equipment, associated with the home-gateway, and the core network, thereby to protect access to communications routed via the at least one further home-gateway to the core network.

35. The computer program product of claim 31, wherein the communication resources interconnecting the home-gateway with the at least one further home-gateway include at least one of RF channel resources, optical connections and wireline connections.

36. A method of generating a charge against a subscriber obtaining broadband access to a core network through isolated connections between a plurality of interconnected distribution gateways each supporting data equipment, the subscriber being affiliated with a particular distribution gateway, and wherein the method comprises:

generating a varying level of subscriber charge for broadband access to the core network in response to use by the subscriber of direct and indirect isolated connections between their associated distribution gateway and the core network; and     recording the varying level of charge in a database for subsequent billing purposes.

37. The method of generating a charge according to claim 36, wherein the isolated connections are point-to-point connections supporting digital subscriber line communications.

38. The method of generating a charge according to claim 36, wherein the varying level of subscriber charge is bandwidth-demand dependent.

39. A computer program product generating a charge against a subscriber obtaining broadband access to a core network through isolated connections between a plurality of interconnected distribution gateways able to support data communication devices, the subscriber being affiliated with a particular distribution gateway, the computer program product comprising:

code that generates a varying level of subscriber charge for broadband access to the core network in response to use by the subscriber of direct and indirect isolated connections between their associated distribution gateway and the core network; and     code that records the varying level of charge in a database for subsequent billing purposes;

wherein the code that arbitrates interconnection and the code that directs the distribution gateway reside in a computer readable medium.

40. Network control equipment responsive to multiple isolated connections to a plurality of home-gateways each providing network access capacity to local data devices serviceable thereby, at least some of the plurality of home-gateways interconnected through communication resources and wherein said interconnected home-gateways each secure network access via multiple isolated connections, the network control equipment comprising:

a consolidation function arranged to direct downstream information packets to a data device associated with a first home-gateway via both a direct isolated connection and an indirect direct isolated connection via a second home-gateway when the direct isolated connection to the first home-gateway is unable to fully support access to the network.

41. Network control equipment according to claim 40, wherein the consolidation function is operable having regard to congestion conditions on the multiple isolated connections.

42. Network control equipment according to claim 40, wherein the consolidation function is operable having regard to priority traffic using the indirect isolated connection.

43. A method of communicating data packets between a network that is coupled to a plurality of distribution gateways through multiple isolated connections, each of the plurality of distribution gateways providing network access capacity to local data devices serviceable thereby, at least some of the plurality of distribution gateways interconnected through communication resources and wherein said interconnected distribution gateways secure network access via multiple isolated connections, the method comprising:

sending data packets between a data device, associated with a first distribution gateway, and the network in an un-encrypted form across a direct isolated connection existing between the network and the distribution gateway; and sending encrypted data packets between the data device and the network across an indirect isolated connection existing between the network and a second distribution gateway interconnected to the first distribution gateway.

44. A method of generating a charge for provisioning network access to a first subscriber in a communication system in which a plurality of subscribers are able to obtain broadband access of varying bandwidth to a core network using multiple isolated connections between a plurality of interconnected distribution gateways and the network, the first subscriber being affiliated with a first distribution gateway interconnected to at least one other distribution gateway such that a combined broadband access capacity supported by the first distribution gateway and the at least one other distribution gateway can be shared therebetween, the method comprising:

monitoring and recording access made to a direct isolated connection between the first distribution gateway and the network by subscribers other than the first subscriber;

charging the first subscriber for leasing the direct isolated connection; and discounting the charge for provisioning network access to the first subscriber based on access made to bandwidth supported by the direct isolated connection by subscribers other than the first subscriber.

45. The method of claim 44, wherein the discounting is subject to a recorded utilisation of the direct isolated connection by subscribers.

46. The method of claim 44, wherein the discounting is subject to meeting a predetermined utilisation of the direct isolated connection by the subscribers other than the first subscriber.

* * * * *